(12) United States Patent
Bao et al.

(10) Patent No.: US 12,526,108 B2
(45) Date of Patent: Jan. 13, 2026

(54) DYNAMIC MEASUREMENT GAP CONTROL

(71) Applicant: QUALCOMM Incorporated, San Diego, CA (US)

(72) Inventors: Jingchao Bao, San Diego, CA (US); Sony Akkarakaran, Poway, CA (US); Tao Luo, San Diego, CA (US); Alexandros Manolakos, Escondido, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 404 days.

(21) Appl. No.: 18/003,210

(22) PCT Filed: Jul. 13, 2021

(86) PCT No.: PCT/US2021/041437
§ 371 (c)(1),
(2) Date: Dec. 23, 2022

(87) PCT Pub. No.: WO2022/026173
PCT Pub. Date: Feb. 3, 2022

(65) Prior Publication Data
US 2023/0318781 A1 Oct. 5, 2023

(30) Foreign Application Priority Data
Jul. 28, 2020 (GR) .............................. 20200100446

(51) Int. Cl.
*H04L 5/00* (2006.01)
*H04W 52/02* (2009.01)

(52) U.S. Cl.
CPC .......... *H04L 5/0051* (2013.01); *H04L 5/0064* (2013.01); *H04L 5/0096* (2013.01); *H04W 52/0216* (2013.01)

(58) Field of Classification Search
CPC ................. H04L 5/0051; H04L 5/0064; H04L 5/0096; H04W 52/0216
See application file for complete search history.

(56) References Cited

U.S. PATENT DOCUMENTS

| 2015/0215837 A1 | 7/2015 | Yiu et al. |
| 2017/0127397 A1 | 5/2017 | Hahn et al. |
(Continued)

FOREIGN PATENT DOCUMENTS

| CN | 108353302 A | 7/2018 |
| CN | 111246518 A | 6/2020 |
(Continued)

OTHER PUBLICATIONS

LG Electronics Inc: "Measurement Gap Skipping for TSN Traffic", R2-1909831, Resubmission of R2-1906744, 3GPP TSG-RAN WG2 Meeting #107, Prague, Czech Republic, Aug. 26-30, 2019, pp. 1-2.
LG Electronics Inc: "Measurement Gap Skipping for TSN Traffic", R2-2001566, Revision of R2-1915919, 3GPP TSG-RAN WG2 Meeting #109 Electronic Elbonia, Feb. 24-Mar. 6, 2020, pp. 1-2.
(Continued)

*Primary Examiner* — Joseph A Bednash
(74) *Attorney, Agent, or Firm* — Thien T. Nguyen

(57) ABSTRACT

Various aspects of the present disclosure generally relate to wireless communication. In some aspects, a user equipment (UE) may receive an indication or follow rules to determine whether to enter or skip a measurement gap. The measurement gap may be a scheduled gap in data communications in order for the UE to measure one or more reference signals. The UE may enter or skip the measurement gap based at least in part on the determination. Numerous other aspects are provided.

58 Claims, 9 Drawing Sheets

300 →

BS 310

330
Determine whether UE is to enter or skip measurement gap

335
Transmit indication to enter or skip measurement gap based at least in part on determining whether UE is to enter or skip measurement gap 340
Enter or skip measurement gap based at least in part on indication

UE 320

(56) References Cited

U.S. PATENT DOCUMENTS

| | | |
|---|---|---|
| 2017/0215096 A1 | 7/2017 | Moon et al. |
| 2019/0021017 A1 | 1/2019 | Nagaraja et al. |
| 2019/0082412 A1 | 3/2019 | Zander et al. |
| 2019/0166539 A1 | 5/2019 | Chen et al. |
| 2019/0174341 A1 | 6/2019 | Chincholi et al. |
| 2022/0264622 A1 | 8/2022 | Lee et al. |
| 2023/0025902 A1 * | 1/2023 | Xu .................... H04W 36/06 |

FOREIGN PATENT DOCUMENTS

| | | | |
|---|---|---|---|
| WO | WO-2011142710 A1 * | 11/2011 | ........... G01S 5/0242 |
| WO | 2020088744 A1 | 5/2020 | |
| WO | WO-2020122617 A1 * | 6/2020 | ............ H04W 24/08 |

OTHER PUBLICATIONS

LG Electronics Inc: "TP on Measurement Gap Enhancement for TSN Traffic", R2-1901772, 3GPP TSG-RAN WG2 Meeting #105, Athens, Greece, Feb. 25-Mar. 1, 2019, pp. 1-2.

Spreadtrum Communications: "Consideration on Collision of Measurement Gap and TSN Traffic", R2-2000564, 3GPP TSG-RAN WG2 Meeting #109 E-meeting, Feb. 24-Mar. 6, 2020, 3 Pages.

International Search Report and Written Opinion—PCT/US2021/041437—ISA/EPO—Nov. 9, 2021.

LG Electronics Inc: "Handling of Measurement Gap", 3GPP TSG-RAN WG2 #63, R2-084157, Jeju, Korea, 20080818-20080822, Aug. 11, 2008, pp. 1-3, Section 2.

Mediatek Inc: "Gap Interruption in Synchronous EN-DC", 3GPP TSG-RAN WG4 Meeting #86bis, R4-1803684, Melbourne, Australia, Apr. 16, 2018-Apr. 20, 2018, Apr. 6, 2018, 4 Pages.

\* cited by examiner

DYNAMIC MEASUREMENT GAP CONTROL

CROSS-REFERENCE TO RELATED APPLICATIONS

This Patent Application is a 371 national stage of PCT Application No. PCT/US2021/041437 filed on Jul. 13, 2021, entitled "DYNAMIC MEASUREMENT GAP CONTROL," which claims priority to Greek patent application Ser. No. 20200100446, filed on Jul. 28, 2020, entitled "DYNAMIC MEASUREMENT GAP CONTROL," and assigned to the assignee hereof. The disclosure of the prior is Applications are considered part of and are incorporated by reference into this Patent Application.

FIELD OF THE DISCLOSURE

Aspects of the present disclosure generally relate to wireless communication and to techniques and apparatuses for dynamically controlling a measurement gap.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" or "forward link" refers to the communication link from the BS to the UE, and "uplink" or "reverse link" refers to the communication link from the UE to the BS. As will be described in more detail herein, a BS may be referred to as a Node B, a gNB, an access point (AP), a radio head, a transmit receive point (TRP), a New Radio (NR) BS, ora 5G Node B.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE, NR, and other radio access technologies.

SUMMARY

In some aspects, a method of wireless communication performed by a user equipment (UE) includes receiving an indication to enter or skip a measurement gap. The measurement gap may be a scheduled gap in data communications in order for the UE to measure one or more reference signals. The method includes entering or skipping the measurement gap based at least in part on the indication.

In some aspects, a method of wireless communication performed by a base station includes determining whether a UE is to enter or skip a measurement gap, and transmitting an indication to enter or skip the measurement gap based at least in part on determining whether the UE is to enter or skip the measurement gap.

In some aspects, a method of wireless communication performed by a UE includes determining whether to enter or skip a measurement gap based at least in part on a rule specified by stored configuration information, and entering or skipping the measurement gap based at least in part on determining whether to enter or skip the measurement gap.

In some aspects, a method of wireless communication performed by a base station includes determining one or more rules for a UE to use to determine whether to enter or skip a measurement gap, and transmitting the one or more rules to the UE.

In some aspects, a UE for wireless communication includes one or more transceivers, a memory, and one or more processors coupled to the one or more transceivers and the memory, the one or more processors configured to receive, via the one or more transceivers, an indication to enter or skip a measurement gap, and enter or skip the measurement gap based at least in part on the indication.

In some aspects, a base station for wireless communication includes one or more transceivers, a memory, and one or more processors coupled to the one or more transceivers and the memory, the one or more processors configured to determine whether a UE is to enter or skip a measurement gap, and transmit, via the one or more transceivers, an indication to enter or skip the measurement gap based at least in part on a determination whether the UE is to enter or skip the measurement gap.

In some aspects, a UE for wireless communication includes one or more transceivers, a memory, and one or more processors coupled to the one or more transceivers and the memory, the one or more processors configured to determine whether to enter or skip a measurement gap based at least in part on a rule specified by stored configuration information, and enter or skip the measurement gap based at least in part on a determination whether to enter or skip the measurement gap.

In some aspects, a base station for wireless communication includes one or more transceivers, a memory, and one or more processors coupled to the one or more transceivers and the memory, the one or more processors configured to determine one or more rules for a UE to use to determine whether to enter or skip a measurement gap, and transmit, via the one or more transceivers, the one or more rules to the UE.

In some aspects, a non-transitory computer-readable medium storing a set of instructions for wireless communication includes one or more instructions that, when executed by one or more processors of a UE, cause the UE to receive, via one or more transceivers, an indication to enter or skip a measurement gap, and enter or skip the measurement gap based at least in part on the indication.

In some aspects, a non-transitory computer-readable medium storing a set of instructions for wireless communication includes one or more instructions that, when executed by one or more processors of a base station, cause the base station to determine whether a UE is to enter or skip a measurement gap, and transmit, via one or more transceivers, an indication to enter or skip the measurement gap based at least in part on a determination whether the UE is to enter or skip the measurement gap.

In some aspects, a non-transitory computer-readable medium storing a set of instructions for wireless communication includes one or more instructions that, when executed by one or more processors of a UE, cause the UE to determine whether to enter or skip a measurement gap based at least in part on a rule specified by stored configuration information, and enter or skip the measurement gap based at least in part on a determination whether to enter or skip the measurement gap.

In some aspects, a non-transitory computer-readable medium storing a set of instructions for wireless communication includes one or more instructions that, when executed by one or more processors of a base station, cause the base station to determine one or more rules for a UE to use to determine whether to enter or skip a measurement, and transmit, via one or more transceivers, the one or more rules to the UE.

In some aspects, an apparatus for wireless communication includes means for receiving an indication to enter or skip a measurement gap and means for entering or skipping the measurement gap based at least in part on the indication.

In some aspects, an apparatus for wireless communication includes means for determining whether a UE is to enter or skip a measurement gap and means for transmitting an indication to enter or skip the measurement gap based at least in part on a determination whether the UE is to enter or skip the measurement gap.

In some aspects, an apparatus for wireless communication includes means for determining whether to enter or skip a measurement gap based at least in part on a rule specified by stored configuration information and means for entering or skipping the measurement gap based at least in part on a determination whether to enter or skip the measurement gap.

In some aspects, an apparatus for wireless communication includes means for determining one or more rules for a UE to use to determine whether to enter or skip a measurement gap and means for transmitting the one or more rules to the UE.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
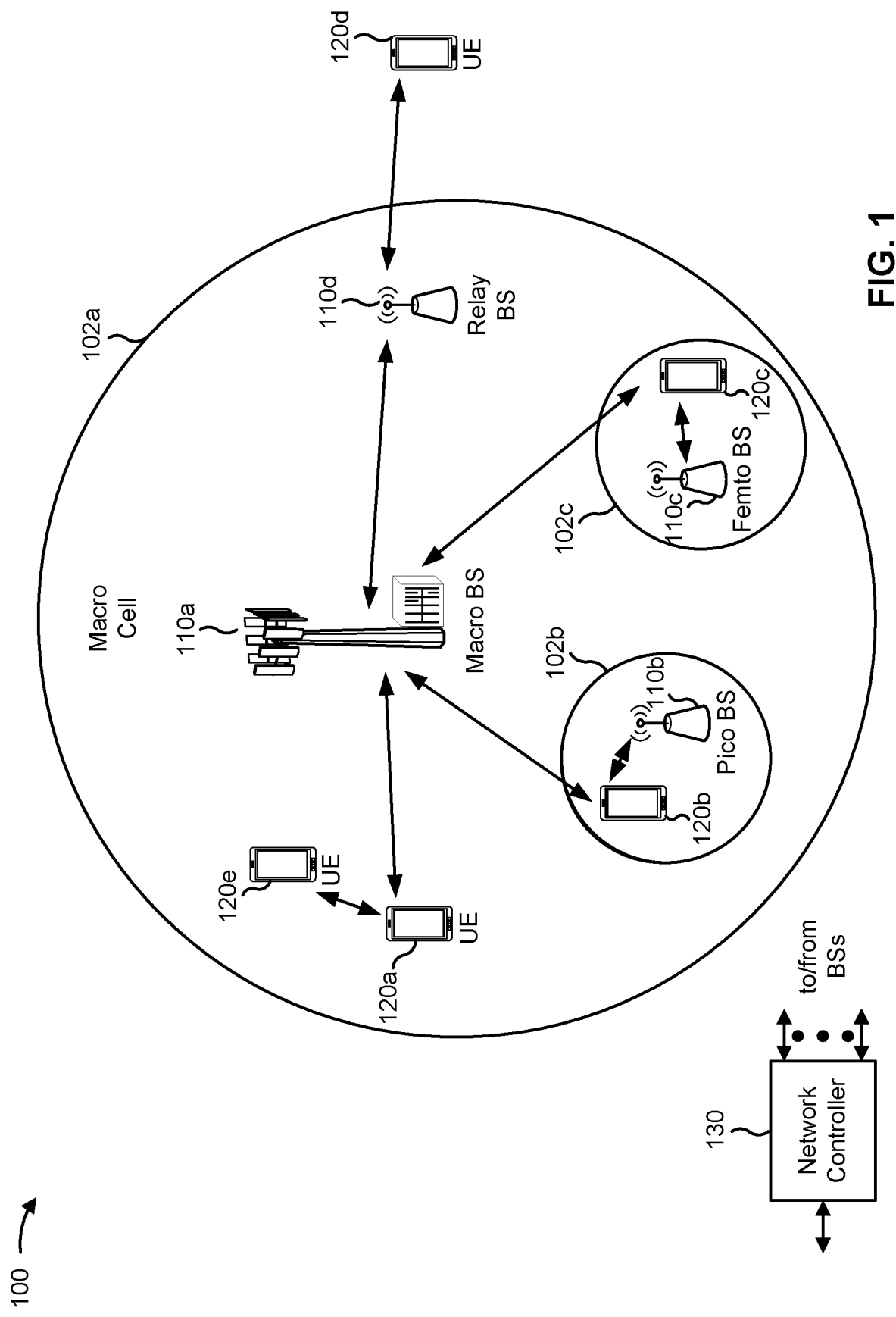
FIG. 1 is a diagram illustrating an example of a wireless network, in accordance with the present disclosure.

FIG. 1 is a diagram illustrating an example of a wireless network 100 in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as a network node, an NR BS, a Node B, an evolved NodeB (eNB), a next generation eNB (ng-eNB), a gNB, a 5G node B (NB), an access point, or a transmit receive point (TRP). Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, or a virtual network using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, or a relay.

Wireless network 100 may be a heterogeneous network that includes BSs of different types, such as macro BSs, pico BSs, femto BSs, and/or relay BSs. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, and/or an air interface. A frequency may also be referred to as a carrier, and/or a frequency channel Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, or a vehicle-to-infrastructure (V2I) protocol), and/or a mesh network. P2P or D2D communications may involve protocols such as Bluetooth® protocols, Zigbee® protocols, or Z-Wave® protocols. P2P or D2D communication protocols may also include protocols for WiFi, LTE-D, PC5, dedicated short-range communications (DSRC), wireless access for vehicular environments (WAVE), ultra-wideband (UWB), and/or near-field communication (NFC). In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
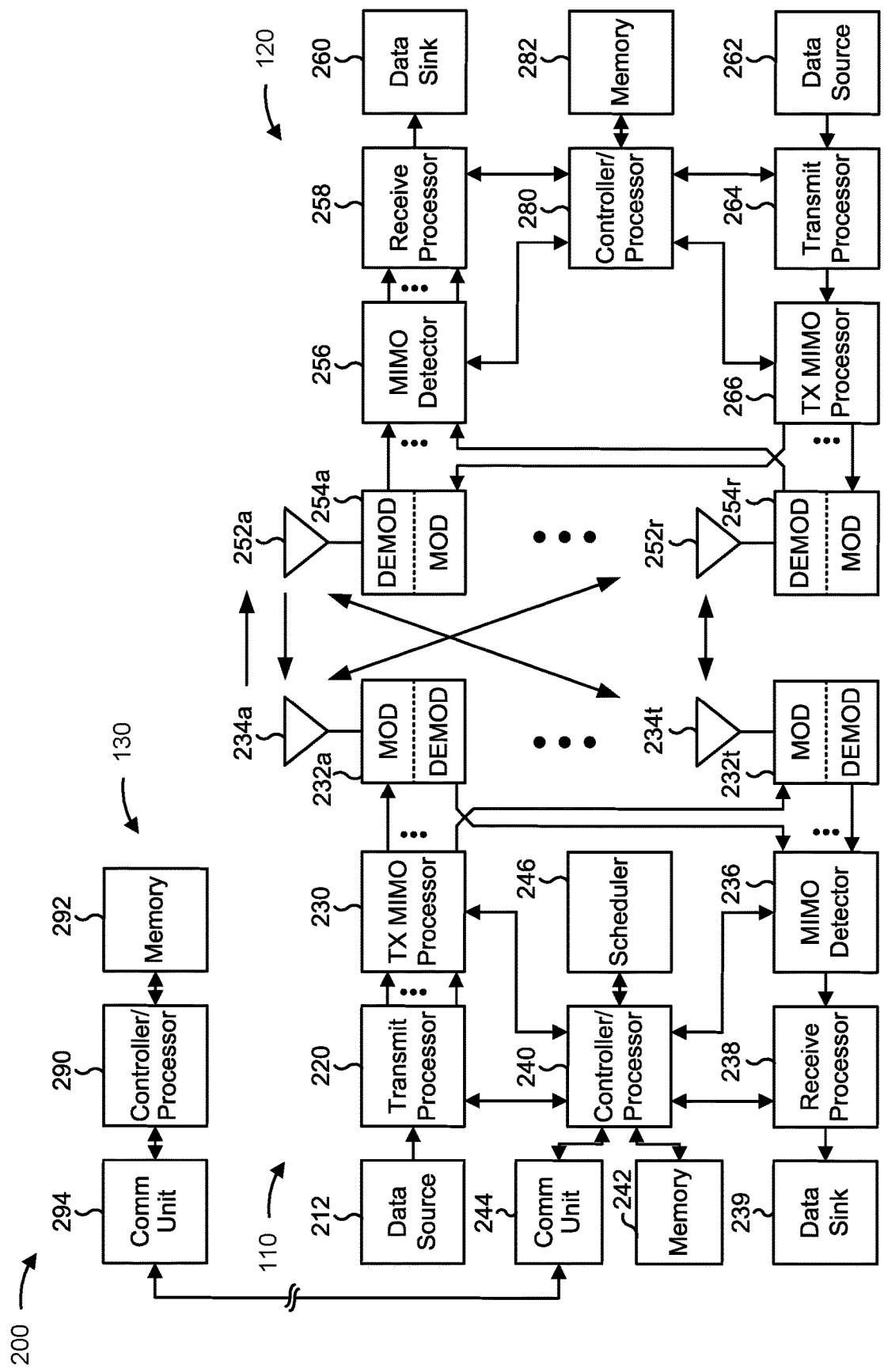
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, upper layer signaling) and provide overhead symbols and control symbols. Transmit processor 220 may also generate reference symbols for reference signals (e.g., a cell-specific reference signal (CRS), a demodulation reference signal (DMRS)) and synchronization signals (e.g., the primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), and/or CQI, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 1-9).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 1-9).

Controller/processor 240 of base station 110, controller/processor 280 of UE 120, and/or any other component(s) of FIG. 2 may perform one or more techniques associated with dynamically controlling a measurement gap, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of base station 110 and/or UE 120, may cause the one or more processors, UE 120, and/or base station 110 to perform or direct operations of, for example, 600 of FIG. 6, process 700 of FIG. 7, process 800 of FIG. 8, process 900 of FIG. 9, and/or other processes as described herein. In some aspects, executing instructions may include running the instructions, converting the instructions, compiling the instructions, and/or interpreting the instructions, among other examples.

In some aspects, UE 120 may include means for receiving an indication to enter or skip a measurement gap, the measurement gap being a scheduled gap in data communications in order for the UE to measure one or more reference signals, and/or means for entering or skipping the measurement gap based at least in part on the indication. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258.

In some aspects, base station 110 may include means for determining whether a UE is to enter or skip a measurement gap, the measurement gap being a scheduled gap in data communications in order for the UE to measure one or more reference signals, and/or means for transmitting an indication to enter or skip the measurement gap based at least in part on a determination whether the UE is to enter or skip the measurement gap. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, and/or antenna 234.

In some aspects, UE 120 may include means for determining whether to enter or skip a measurement gap based at least in part on a rule specified by stored configuration information, the measurement gap being a scheduled gap in data communications in order for the UE to measure one or more reference signals, and/or means for entering or skipping the measurement gap based at least in part on a determination whether to enter or skip the measurement gap. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258.

In some aspects, base station 110 may include means for determining one or more rules for a UE to use to determine whether to enter or skip a measurement gap, the measurement gap being a scheduled gap in data communications in order for the UE to measure one or more reference signals, and/or means for transmitting the one or more rules to the UE. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, and/or antenna 234.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

A UE may use a measurement gap for radio resource management (RRM). The measurement gap may be a scheduled time gap in data communications that allows for the UE to measure one or more reference signals. Measurements taken during the measurement gap may be used to adjust a radio frequency chain or a bandwidth part for reception. The UE may "enter" the time gap by halting data communications and taking measurements of reference signals. The measurement gap may be configured before or during setup of a connection.

When a UE is configured with a measurement gap, the UE may enter the measurement gap unless the measurement gap conflicts in time with a random access channel (RACH) procedure. A fixed priority order may specify that a RACH has a higher priority than RRM, and that RRM has a higher priority than data communications.

A measurement gap may be associated with one or more reference signals to be measured, such as a positioning reference signal (PRS). PRS measurements may help a network to follow a location of a UE. The network may have a location management function (LMF), in a core of the network, that supports location determination for a UE and obtains location estimates from the UE. However, the PRS and other measurements may not be part of an existing fixed priority order. For example, the PRS may have a higher priority or a lower priority than data communications based on positioning requirements. If the measurement gap is not entered (is skipped) when PRS has a higher priority than data communications, the network may not have an accurate location of the UE. Without an accurate location of the UE, the network may make decisions based on inaccurate location information. This may lead to degraded or lost communications, and the UE and the network may waste power, processing resources, and signaling resources establishing a UE location and/or retransmitting communications.

According to various aspects described herein, a UE may dynamically control a measurement gap. That is, the UE may dynamically control whether the UE enters a scheduled measurement gap to take reference signal measurements or skips the measurement gap to transmit or receive data communications. In some aspects, the UE may receive an indication, from the network, whether to enter or skip the measurement gap. In some aspects, the UE may use traffic type rules to determine whether to enter or skip the measurement gap. By dynamically controlling the measurement gap, the UE may enter the measurement gap to take measurements when appropriate, or skip the measurement gap to transmit or receive data communications when appropriate. As a result, the network improves location management of the UE while not losing data communications that may have a higher priority than reference signal measurements. The UE and the network also conserve resources that would otherwise be consumed by trying to locate a UE or by retransmitting data communications.

Figure 3:
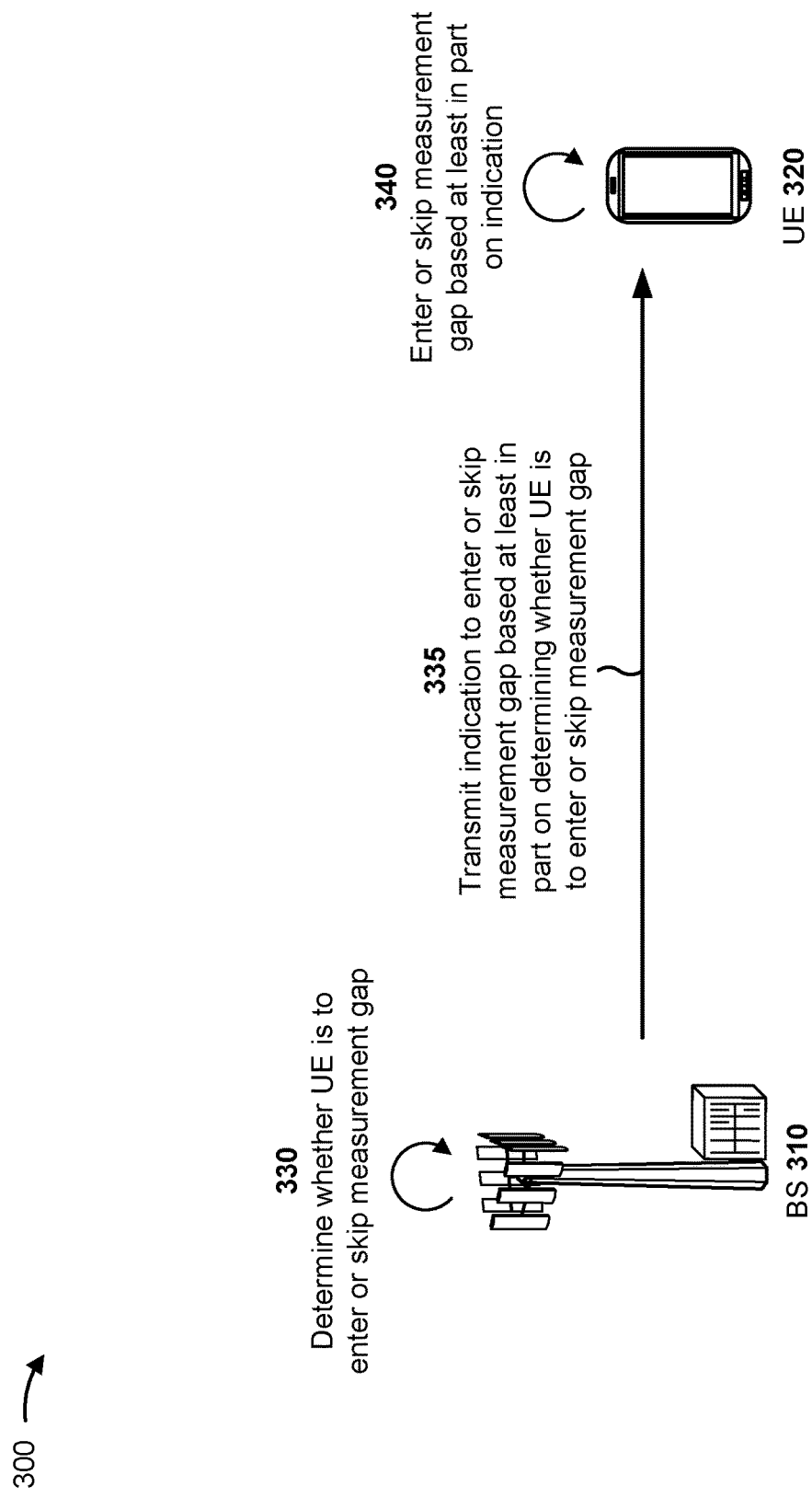
FIG. 3 is a diagram illustrating an example of dynamically controlling a measurement gap, in accordance with the present disclosure.

FIG. 3 is a diagram illustrating an example 300 of dynamically controlling a measurement gap, in accordance with the present disclosure. As shown in FIG. 3, example 300 includes communication between a base station (BS) 310 (e.g., a BS 110 depicted in FIGS. 1 and 2) and a UE 320 (e.g., a UE 120 depicted in FIGS. 1 and 2). In some aspects, BS 310 and UE 320 may be included in a wireless network, such as wireless network 100. BS 310 and UE 320 may communicate on a wireless access link, which may include an uplink and a downlink.

In some aspects, UE 320 may skip or enter a measurement gap based at least in part on receiving an indication from the network (e.g., via BS 310). As shown by reference number 330, BS 310 may determine whether a UE is to enter or skip a measurement gap. The measurement gap may be scheduled by a configuration. BS 310 may determine, from traffic type rules, whether data communications have a higher priority than measurements from reference signals during the measurement gap. BS 310 may make such a determination for an individual measurement gap, for a quantity of measurement gaps, and/or for a time period.

As shown by reference number 335, BS 310 may transmit an indication to UE 320 to enter or skip an upcoming measurement gap based at least in part on determining whether to enter or skip the measurement gap. For example, if BS 310 determines that UE 320 is to skip a measurement gap because data communications at the time have a higher priority than a reference signal (e.g., a periodic PRS), BS 310 may transmit an indication to skip the measurement gap. If BS 310 determines that UE 320 is to enter a measurement gap because a reference signal (e.g., an aperiodic PRS) has a higher priority than data communications, BS 310 may transmit an indication to enter the measurement gap. In some aspects, BS 310 may transmit the indication in downlink control information (DCI) or in a medium access control control element (MAC CE). As shown by reference number 340, UE 320 may enter or skip the measurement gap based at least in part on the indication.

In some aspects, UE 320 may be scheduled to enter the measurement gap, and BS 310 does not need to transmit an indication to enter the measurement gap. Rather, BS 310 may only transmit indications to skip measurement gaps.

As indicated above, FIG. 3 is provided as an example. Other examples may differ from what is described with regard to FIG. 3.

Figure 4:
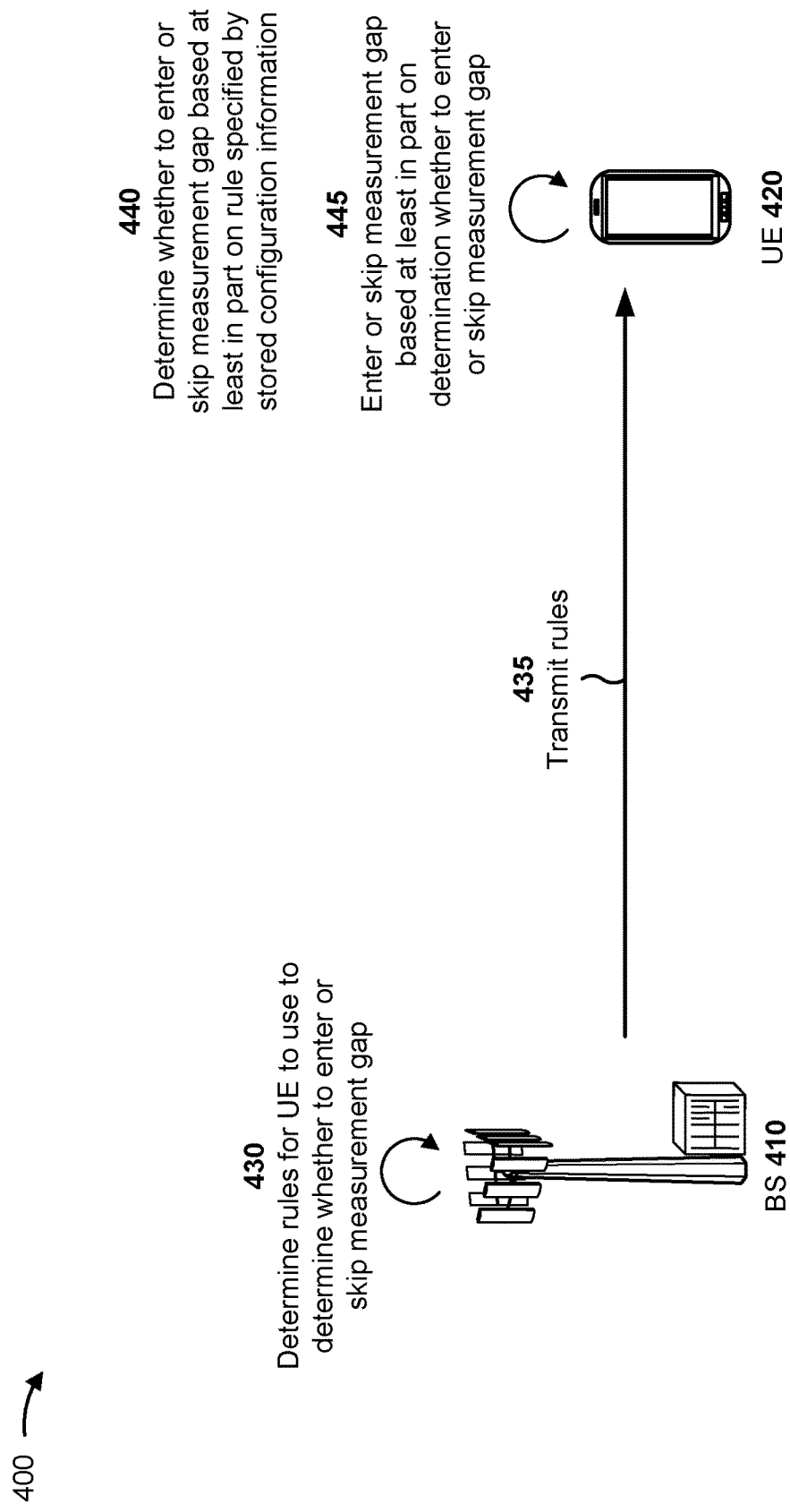
FIG. 4 is a diagram illustrating an example of dynamically controlling a measurement gap, in accordance with the present disclosure.

FIG. 4 is a diagram illustrating example 400 of dynamically controlling a measurement gap, in accordance with the present disclosure. As shown in FIG. 4, example 400 includes communication between BS 410 (e.g., a BS 110 depicted in FIGS. 1 and 2) and a UE 420 (e.g., a UE 120 depicted in FIGS. 1 and 2). In some aspects, BS 410 and UE 420 may be included in a wireless network, such as wireless network 100. BS 410 and UE 420 may communicate on a wireless access link, which may include an uplink and a downlink.

In some aspects, UE 420 may determine whether to skip or enter a measurement gap based at least in part on one or more rules specified by stored configuration information. The rules may include rules that specify which traffic types have a higher priority than other traffic types. The rules may also specify whether to skip a measurement gap based at least in part on a result of comparing traffic types for a measurement gap conflict. In some aspects, BS 410 may configure UE 420 with the rules. As shown by reference number 430, BS 410 may determine the rules. BS 410 may determine rules for traffic types, such as types of data communications and/or types of reference signals. BS 410 may also determine rules based at least in part on whether reference signals are aperiodic, semi-persistent, or periodic. As shown by reference number 435, BS 410 may transmit the rules to UE 420. BS 410 may transmit the rules in one or more radio resource control (RRC) messages. UE 420 may store the rules as part of stored configuration information. In some aspects, UE 420 already has stored configuration information that specifies one or more rules. For example, UE 420 may be preconfigured with one or more rules before entering operation.

As shown by reference number 440, UE 420 may determine whether to enter a scheduled measurement gap or skip the measurement gap based at least in part on the rules. This may involve comparing a type of data communications and a priority rule, and/or comparing a type of reference signal and the priority rule. UE 420 may determine whether to enter or skip the measurement gap based at least in part on a result of one or more of the comparisons.

As shown by reference number 445, UE 420 may enter or skip the measurement gap based at least in part on the determination made in connection with reference number 440. For example, UE 420 may enter the measurement gap if reference signal measurements have a higher priority than data communications at a time in which the measurement gap is scheduled. Alternatively, UE 420 may skip the measurement gap if the data communications have a higher priority than the reference signals. In some aspects, a priority rule may apply to one or more measurement gaps. In some aspects, a measurement gap may be associated with one reference signal type or multiple reference signal types, such as a mix of signals for RRM and/or PRS.

As indicated above, FIG. 4 is provided as an example. Other examples may differ from what is described with regard to FIG. 4.

Figure 5:
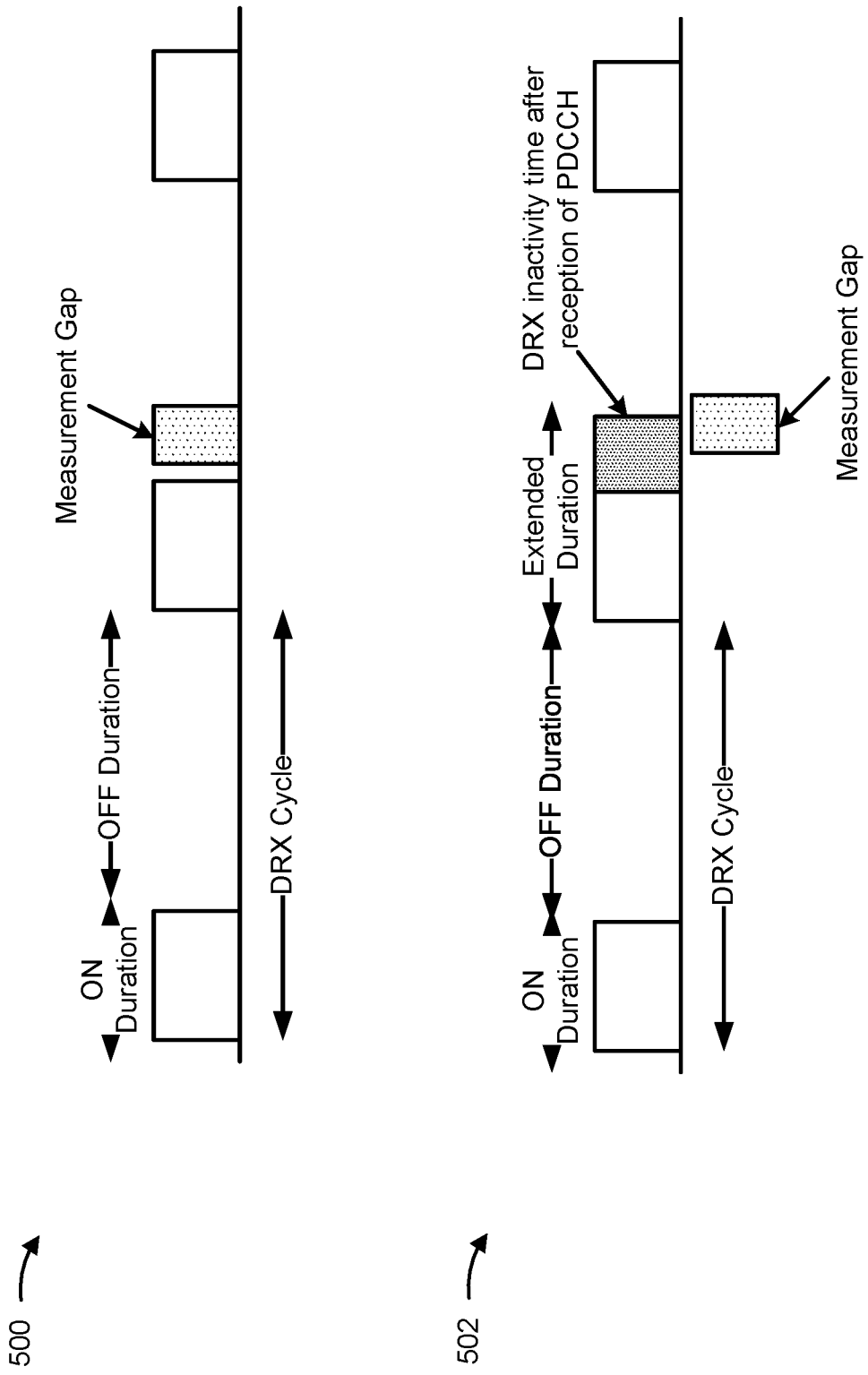
FIG. 5 is a diagram illustrating examples of a measurement gap during a discontinuous reception cycle, in accordance with the present disclosure.

FIG. 5 is a diagram illustrating examples 500, 502 of a measurement gap during a discontinuous reception (DRX) cycle, in accordance with the present disclosure.

DRX is a mechanism in which a UE enters a sleep mode for monitoring a physical downlink control channel (PDCCH) for a certain period of time and wakes up to monitor the PDCCH for another period of time. DRX active time is the time during which the UE is considered to be monitoring the PDCCH. This may involve an "on duration" timer. The UE may save power by not monitoring the PDCCH all the time.

Example 500 in FIG. 5 shows a DRX cycle with periods when the UE is DRX active. A measurement gap may be scheduled during a DRX active time or during a DRX off time. PRS is measured within a measurement gap and it may be beneficial to schedule the measurement gap within the DRX off time.

The UE may normally enter the measurement gap regardless of a DRX state, whether during DRX active time or during DRX off time. This may cause a collision with any data communications. Example 502 shows a DRX active time that is extended due to an inactivity timer that started upon reception of a PDCCH. The measurement gap is to overlap data communications that follow the PDCCH. In some aspects, the UE may follow rules to dynamically control the measurement gap. That is, the UE may enter or skip the measurement gap based at least in part on a priority of the data communications and/or a priority of the reference signals to be measured during the measurement gap. As a result, the UE dynamically selects an appropriate action, which preserves data communications and/or an accurate location of the UE.

As indicated above, FIG. 5 provides some examples. Other examples may differ from what is described with regard to FIG. 5.

Figure 6:
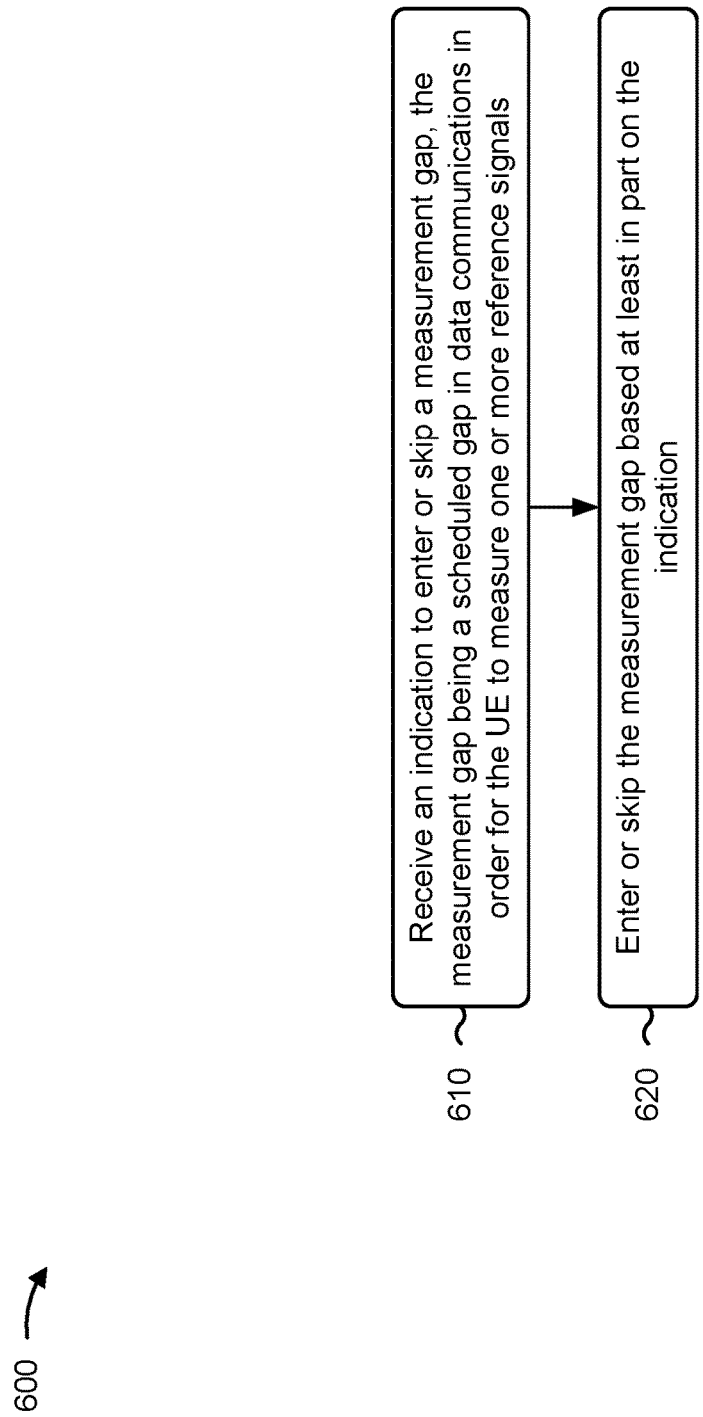
FIG. 6 is a diagram illustrating an example process performed, for example, by a UE, in accordance with the present disclosure.

FIG. 6 is a diagram illustrating an example process 600 performed, for example, by a UE, in accordance with the present disclosure. The process 600 is an example where the UE (for example, a UE 120 depicted in FIGS. 1-2, UE 320 depicted in FIG. 3) performs operations associated with dynamically controlling a measurement gap.

As shown in FIG. 6, in some aspects, the process 600 may include receiving an indication to enter or skip a measurement gap (block 610). For example, the UE (for example, using antenna 234, demodulator 232, MIMO detector 236, receive processor 238, controller/processor 240, memory 242, or another component; or using antenna 252, demodulator 254, MIMO detector 256, receive processor 258, controller/processor 280, memory 282, or another component) may receive an indication to enter or skip a measurement gap, as described above. In some aspects, the measurement gap is a scheduled gap in data communications in order for the UE to measure one or more reference signals.

As further shown in FIG. 6, in some aspects, the process 600 may include entering or skipping the measurement gap based at least in part on the indication (block 620). For example, the UE (for example, using transmit processor 220, TX MIMO processor 230, modulator 232, antenna 234, demodulator 232, MIMO detector 236, receive processor 238, controller/processor 240, memory 242, scheduler 246, or another component; or using antenna 252, demodulator 254, MIMO detector 256, receive processor 258, transmit processor 264, TX MIMO processor 266, modulator 254, controller/processor 280, memory 282, or another component) may enter or skip the measurement gap based at least in part on the indication, as described above.

The process 600 may include additional aspects, such as any single aspect or any combination of aspects described below or in connection with one or more other processes described elsewhere herein.

In a first additional aspect, receiving the indication includes receiving the indication in DCI.

In a second additional aspect, alone or in combination with the first aspect, receiving the indication includes receiving the indication in a MAC CE.

In a third additional aspect, alone or in combination with one or more of the first and second aspects, the one or more reference signals include a PRS.

In a fourth additional aspect, alone or in combination with one or more of the first through third aspects, the measurement gap overlaps in time with data to be transmitted or received by the UE as part of a DRX active state.

In a fifth additional aspect, alone or in combination with one or more of the first through fourth aspects, the indication instructs the UE to enter the measurement gap, and entering or skipping the measurement gap includes entering the measurement gap.

In a sixth additional aspect, alone or in combination with one or more of the first through fifth aspects, the indication instructs the UE to skip the measurement gap, and entering or skipping the measurement gap includes skipping the measurement gap.

Although FIG. 6 shows example blocks of the process 600, in some aspects, the process 600 may include additional blocks, fewer blocks, different blocks, or differently arranged blocks than those depicted in FIG. 6. Additionally, or alternatively, two or more of the blocks of the process 600 may be performed in parallel.

Figure 7:
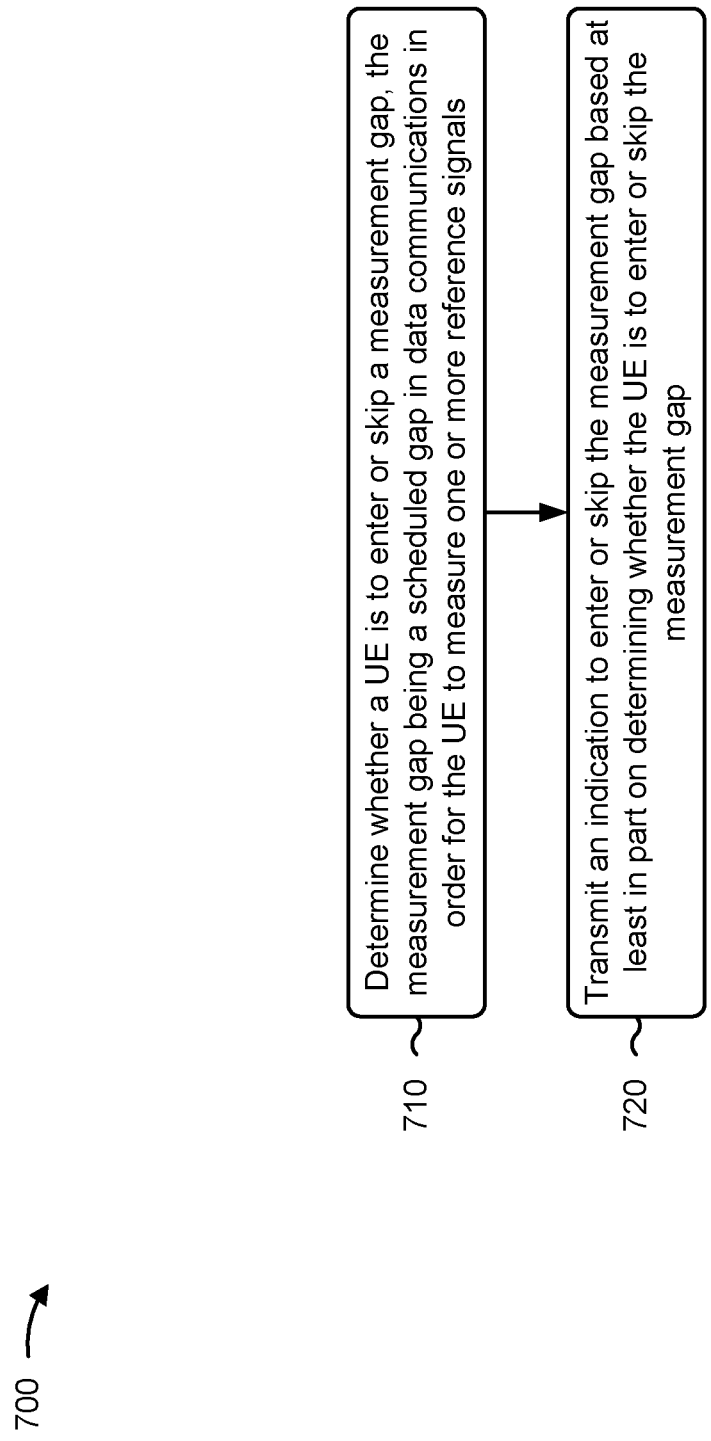
FIG. 7 is a diagram illustrating an example process performed, for example, by a base station, in accordance with the present disclosure.

FIG. 7 is a diagram illustrating an example process 700 performed, for example, by a base station, in accordance with the present disclosure. The process 700 is an example where the base station (for example, base station 110 depicted in FIGS. 1 and 2, BS 310 depicted in FIG. 3) performs operations associated with dynamically controlling a measurement gap.

As shown in FIG. 7, in some aspects, the process 700 may include determining whether a UE is to enter or skip a measurement gap (block 710). For example, the base station (for example, using transmit processor 220, TX MIMO processor 230, modulator 232, antenna 234, demodulator 232, MIMO detector 236, receive processor 238, controller/processor 240, memory 242, scheduler 246, or another component) may determine whether a UE is to enter or skip a measurement gap, as described above. In some aspects, the measurement gap is a scheduled gap in data communications in order for the UE to measure one or more reference signals.

As further shown in FIG. 7, in some aspects, the process 700 may include transmitting an indication to enter or skip the measurement gap based at least in part on determining whether the UE is to enter or skip the measurement gap (block 720). For example, the base station (for example, using transmit processor 220, TX MIMO processor 230, modulator 232, antenna 234, controller/processor 240, memory 242, scheduler 246, or another component) may transmit an indication to enter or skip the measurement gap based at least in part on a determination whether the UE is to enter or skip the measurement gap, as described above.

The process 700 may include additional aspects, such as any single aspect or any combination of aspects described below or in connection with one or more other processes described elsewhere herein.

In a first additional aspect, determining whether the UE is to enter or skip the measurement gap includes determining whether the UE is to enter or skip the measurement gap based at least in part on a priority rule.

In a second additional aspect, alone or in combination with the first aspect, transmitting the indication includes transmitting the indication in DCI.

In a third additional aspect, alone or in combination with one or more of the first and second aspects, transmitting the indication includes transmitting the indication in a MAC CE.

In a fourth additional aspect, alone or in combination with one or more of the first through third aspects, the one or more reference signals include a PRS.

In a fifth additional aspect, alone or in combination with one or more of the first through fourth aspects, the measurement gap overlaps in time with data to be transmitted or received by the UE as part of a DRX active state.

In a sixth additional aspect, alone or in combination with one or more of the first through fifth aspects, the indication instructs the UE to enter the measurement gap.

In a seventh additional aspect, alone or in combination with one or more of the first through sixth aspects, the indication instructs the UE to skip the measurement gap.

Although FIG. 7 shows example blocks of the process 700, in some aspects, the process 700 may include additional blocks, fewer blocks, different blocks, or differently arranged blocks than those depicted in FIG. 7. Additionally, or alternatively, two or more of the blocks of the process 700 may be performed in parallel.

Figure 8:
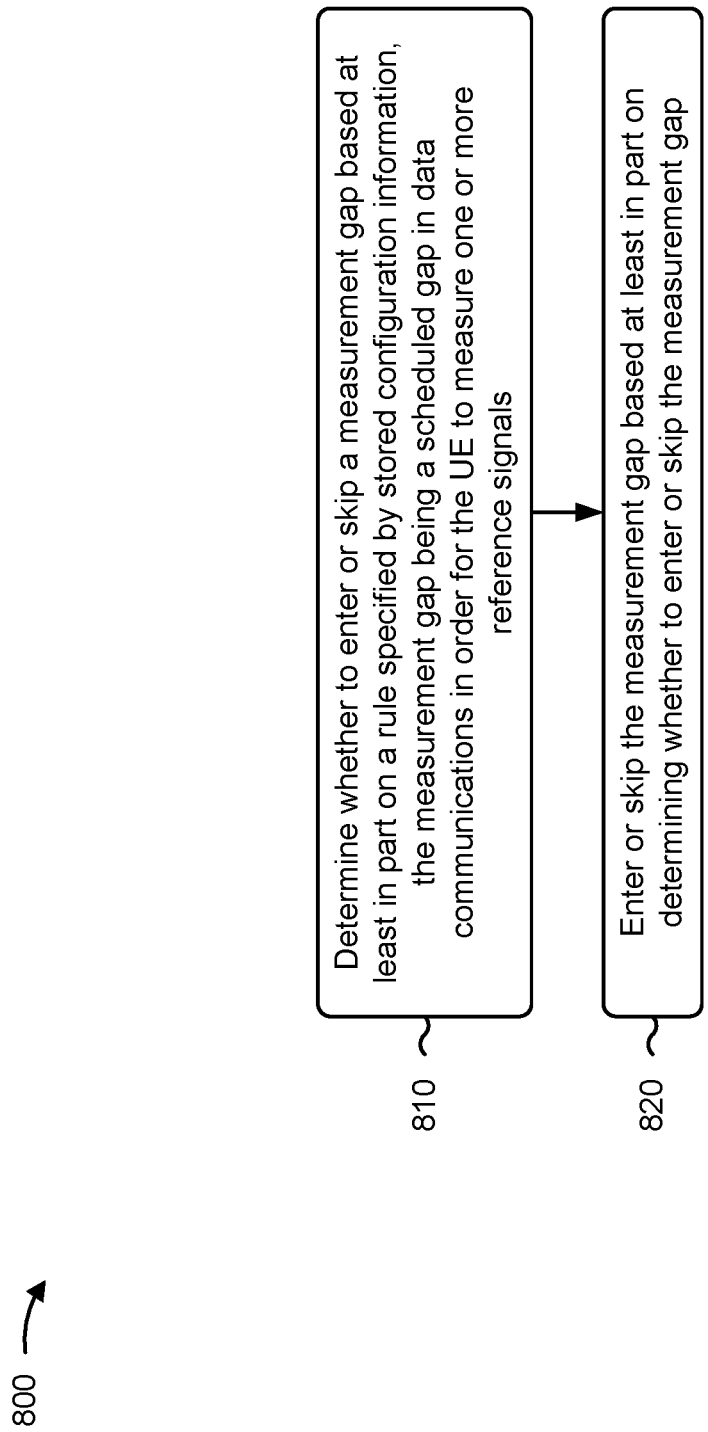
FIG. 8 is a diagram illustrating an example process performed, for example, by a UE, in accordance with the present disclosure.

FIG. 8 is a diagram illustrating an example process 800 performed, for example, by a UE, in accordance with the present disclosure. The process 800 is an example where the UE (for example, a UE 120 depicted in FIGS. 1-2, UE 420 depicted in FIG. 4, and/or the like) performs operations associated with dynamically controlling a measurement gap.

As shown in FIG. 8, in some aspects, the process 800 may include determining whether to enter or skip a measurement gap based at least in part on a rule specified by stored configuration information (block 810). For example, the UE (for example, using transmit processor 220, TX MIMO processor 230, modulator 232, antenna 234, demodulator 232, MIMO detector 236, receive processor 238, controller/processor 240, memory 242, scheduler 246, or another component; or using antenna 252, demodulator 254, MIMO detector 256, receive processor 258, transmit processor 264, TX MIMO processor 266, modulator 254, controller/processor 280, memory 282, or another component) may determine whether to enter or skip a measurement gap based at least in part on a rule specified by stored configuration information, as described above. In some aspects, the measurement gap is a scheduled gap in data communications in order for the UE to measure one or more reference signals.

As further shown in FIG. 8, in some aspects, the process 800 may include entering or skipping the measurement gap based at least in part on determining whether to enter or skip the measurement gap (block 820). For example, the UE (for example, using transmit processor 220, TX MIMO processor 230, modulator 232, antenna 234, demodulator 232, MIMO detector 236, receive processor 238, controller/processor 240, memory 242, scheduler 246, or another component; or using antenna 252, demodulator 254, MIMO detector 256, receive processor 258, transmit processor 264, TX MIMO processor 266, modulator 254, controller/processor 280, memory 282, or another component) may enter or skip the measurement gap based at least in part on a determination whether to enter or skip the measurement gap, as described above.

The process 800 may include additional aspects, such as any single aspect or any combination of aspects described below or in connection with one or more other processes described elsewhere herein.

In a first additional aspect, determining whether to enter or skip the measurement gap includes determining to skip the measurement gap based at least in part on the rule specifying that a priority of data scheduled to overlap the measurement gap is greater than a priority of the one or more reference signals, and entering or skipping the measurement gap includes skipping the measurement gap based at least in part on determining to skip the measurement gap.

In a second additional aspect, alone or in combination with the first aspect, determining whether to enter or skip the measurement gap includes determining to enter the measurement gap based at least in part on the rule specifying that a priority of data scheduled to overlap the measurement gap is lower than a priority of the one or more reference signals, and entering or skipping the measurement gap includes entering the measurement gap based at least in part on determining to enter the measurement gap.

In a third additional aspect, alone or in combination with one or more of the first and second aspects, the one or more reference signals include a positioning reference signal.

In a fourth additional aspect, alone or in combination with one or more of the first through third aspects, determining whether to enter or skip the measurement gap includes determining that a DRX active time is to overlap with the measurement gap and determining to skip the measurement gap based at least in part on a determination that a priority of a data type for communication during the DRX active time is greater than a priority of the one or more reference signals, and entering or skipping the measurement gap includes skipping the measurement gap based at least in part on determining to skip the measurement gap.

In a fifth additional aspect, alone or in combination with one or more of the first through fourth aspects, determining whether to enter or skip the measurement gap includes determining that a DRX active time is to overlap with the measurement gap and determining to enter the measurement gap based at least in part on a determination that a priority of a data type for communication during the DRX active time is less than a priority of the one or more reference signals, and entering or skipping the measurement gap includes entering the measurement gap based at least in part on determining to enter the measurement gap.

In a sixth additional aspect, alone or in combination with one or more of the first through fifth aspects, the stored configuration information is received in an RRC message.

Although FIG. 8 shows example blocks of the process 800, in some aspects, the process 800 may include additional blocks, fewer blocks, different blocks, or differently arranged blocks than those depicted in FIG. 8. Additionally, or alternatively, two or more of the blocks of the process 800 may be performed in parallel.

Figure 9:
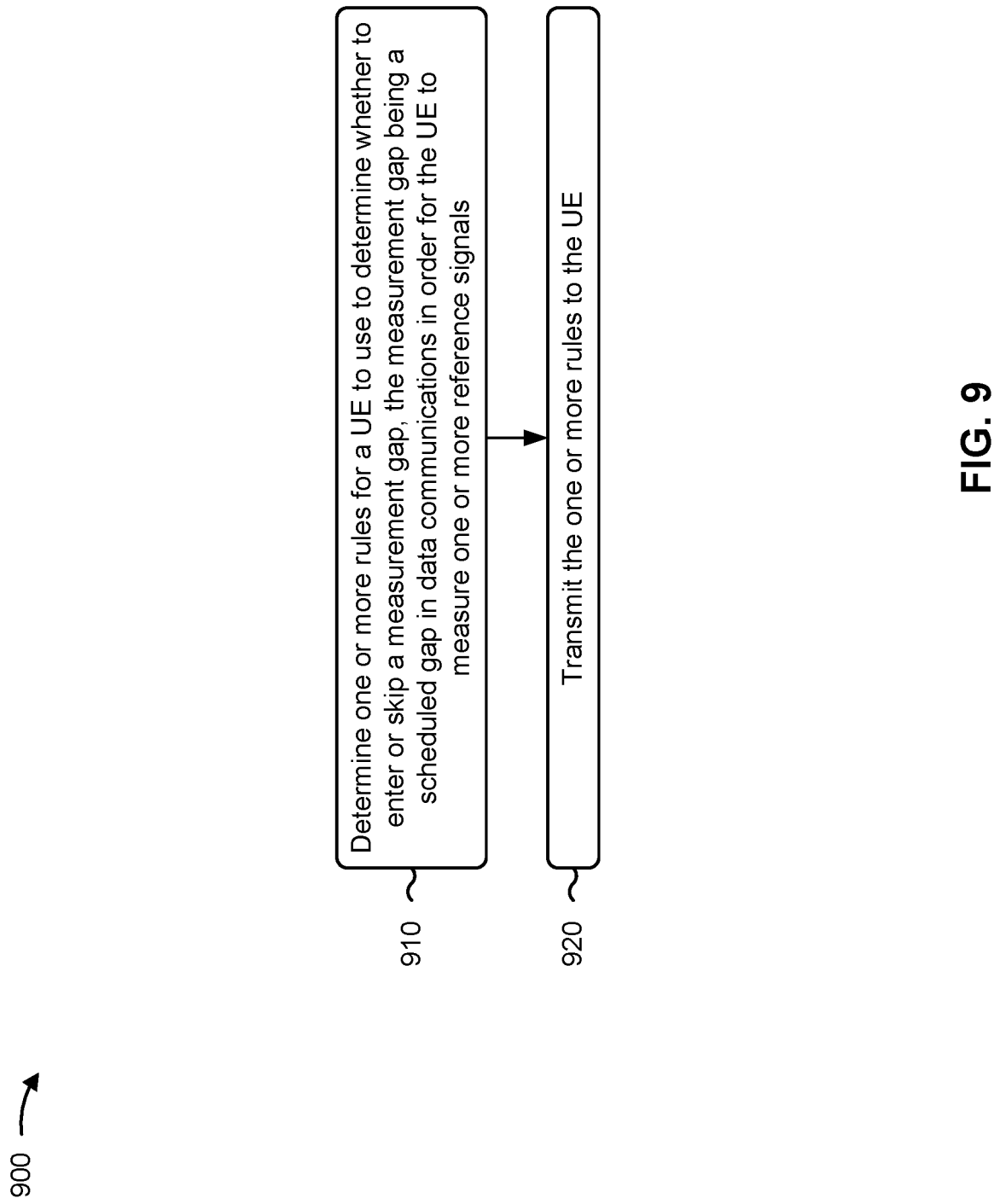
FIG. 9 is a diagram illustrating an example process performed, for example, by a base station, in accordance with the present disclosure.

FIG. 9 is a diagram illustrating an example process 900 performed, for example, by a base station, in accordance with the present disclosure. The process 900 is an example where the base station (for example, base station 110 depicted in FIGS. 1-2, BS 410 depicted in FIG. 4, and/or the like) performs operations associated with dynamically controlling a measurement gap.

As shown in FIG. 9, in some aspects, the process 900 may include determining one or more rules for a UE to use to determine whether to enter or skip a measurement gap (block 910). For example, the base station (for example, using transmit processor 220, TX MIMO processor 230, modulator 232, antenna 234, demodulator 232, MIMO detector 236, receive processor 238, controller/processor 240, memory 242, scheduler 246, or another component) may determine one or more rules for a UE to use to determine whether to enter or skip a measurement gap, as described above. In some aspects, the measurement gap is a scheduled gap in data communications in order for the UE to measure one or more reference signals.

As further shown in FIG. 9, in some aspects, the process 900 may include transmitting the one or more rules to the UE (block 920). For example, the base station (for example, using transmit processor 220, TX MIMO processor 230, modulator 232, antenna 234, controller/processor 240, memory 242, scheduler 246, or another component) may transmit the one or more rules to the UE, as described above.

The process 900 may include additional aspects, such as any single aspect or any combination of aspects described below or in connection with one or more other processes described elsewhere herein.

In a first additional aspect, transmitting the one or more rules includes transmitting an indication of the one or more rules in an RRC control message.

In a second additional aspect, alone or in combination with the first aspect, the one or more rules specify that a priority of data scheduled to overlap the measurement gap is greater than a priority of the one or more reference signals.

In a third additional aspect, alone or in combination with one or more of the first and second aspects, the one or more rules specify that a priority of data scheduled to overlap the measurement gap is less than a priority of the one or more reference signals.

In a fourth additional aspect, alone or in combination with one or more of the first through third aspects, the one or more reference signals include a positioning reference signal.

In a fifth additional aspect, alone or in combination with one or more of the first through fourth aspects, the one or more rules specify that a priority of a data type for communication during a DRX active time is greater than a priority of the one or more reference signals.

In a sixth additional aspect, alone or in combination with one or more of the first through fifth aspects, the one or more rules specify that a priority of a data type for communication during a DRX active time is less than a priority of the one or more reference signals.

Although FIG. 9 shows example blocks of the process 900, in some aspects, the process 900 may include additional blocks, fewer blocks, different blocks, or differently arranged blocks than those depicted in FIG. 9. Additionally, or alternatively, two or more of the blocks of the process 900 may be performed in parallel.

The following provides an overview of some Aspects of the present disclosure:

Aspect 1: A method of wireless communication performed by a user equipment (UE), comprising: receiving an indication to enter or skip a measurement gap, the measurement gap being a scheduled gap in data communications in order for the UE to measure one or more reference signals; and entering or skipping the measurement gap based at least in part on the indication.

Aspect 2: The method of Aspect 1, wherein receiving the indication includes receiving the indication in downlink control information.

Aspect 3: The method of Aspect 1, wherein receiving the indication includes receiving the indication in a medium access control control element (MAC CE).

Aspect 4: The method of any of Aspects 1-3, wherein the one or more reference signals include a positioning reference signal.

Aspect 5: The method of any of Aspects 1-4, wherein the measurement gap overlaps in time with data to be transmitted or received by the UE as part of a discontinuous reception active state.

Aspect 6: The method of any of Aspects 1-5, wherein the indication instructs the UE to enter the measurement gap, and wherein entering or skipping the measurement gap includes entering the measurement gap.

Aspect 7: The method of any of Aspects 1-5, wherein the indication instructs the UE to skip the measurement gap, and wherein entering or skipping the measurement gap includes skipping the measurement gap.

Aspect 8: A method of wireless communication performed by a base station, comprising: determining whether a user equipment (UE) is to enter or skip a measurement gap, the measurement gap being a scheduled gap in data communications in order for the UE to measure one or more reference signals; and transmitting an indication to enter or skip the measurement gap based at least in part on determining whether the UE is to enter or skip the measurement gap.

Aspect 9: The method of Aspect 8, wherein determining whether the UE is to enter or skip the measurement gap includes determining whether the UE is to enter or skip the measurement gap based at least in part on a priority rule.

Aspect 10: The method of Aspect 8 or 9, wherein transmitting the indication includes transmitting the indication in downlink control information.

Aspect 11: The method of any of Aspects 8-10, wherein transmitting the indication includes transmitting the indication in a medium access control control element (MAC CE).

Aspect 12: The method of any of Aspects 8-11, wherein the one or more reference signals include a positioning reference signal.

Aspect 13: The method of any of Aspects 8-12, wherein the measurement gap overlaps in time with data to be transmitted or received by the UE as part of a discontinuous reception active state.

Aspect 14: The method of any of Aspects 8-13, wherein the indication instructs the UE to enter the measurement gap.

Aspect 15: The method of any of Aspects 8-13, wherein the indication instructs the UE to skip the measurement gap.

Aspect 16: A method of wireless communication performed by a user equipment (UE), comprising: determining whether to enter or skip a measurement gap based at least in part on a rule specified by stored configuration information, the measurement gap being a scheduled gap in data communications in order for the UE to measure one or more reference signals; and entering or skipping the measurement gap based at least in part on determining whether to enter or skip the measurement gap.

Aspect 17: The method of Aspect 16, wherein determining whether to enter or skip the measurement gap includes determining to skip the measurement gap based at least in part on the rule specifying that a priority of data scheduled to overlap the measurement gap is greater than a priority of the one or more reference signals, and wherein entering or skipping the measurement gap includes skipping the measurement gap based at least in part on determining to skip the measurement gap.

Aspect 18: The method of Aspect 16, wherein determining whether to enter or skip the measurement gap includes determining to enter the measurement gap based at least in part on the rule specifying that a priority of data scheduled to overlap the measurement gap is lower than a priority of the one or more reference signals, and wherein entering or skipping the measurement gap includes entering the measurement gap based at least in part on determining to enter the measurement gap.

Aspect 19: The method of any of Aspects 16-18, wherein the one or more reference signals include a positioning reference signal.

Aspect 20: The method of Aspect 16, wherein determining whether to enter or skip the measurement gap includes determining that a discontinuous reception (DRX) active time is to overlap with the measurement gap and determining to skip the measurement gap based at least in part on a determination that a priority of a data type for communication during the DRX active time is greater than a priority of the one or more reference signals, and wherein entering or skipping the measurement gap includes skipping the measurement gap based at least in part on determining to skip the measurement gap.

Aspect 21: The method of Aspect 16, wherein determining whether to enter or skip the measurement gap includes determining that a discontinuous reception (DRX) active time is to overlap with the measurement gap and determining to enter the measurement gap based at least in part on a determination that a priority of a data type for communication during the DRX active time is less than a priority of the one or more reference signals, and wherein entering or skipping the measurement gap includes entering the measurement gap based at least in part on determining to enter the measurement gap.

Aspect 22: The method of any of Aspects 20-21, wherein the stored configuration information is received in a radio resource control message.

Aspect 23: A method of wireless communication performed by a base station, comprising: determining one or more rules for a user equipment (UE) to use to determine whether to enter or skip a measurement gap, the measurement gap being a scheduled gap in data communications in order for the UE to measure one or more reference signals; and transmitting the one or more rules to the UE.

Aspect 24: The method of Aspect 23, wherein transmitting the one or more rules includes transmitting an indication of the one or more rules in a radio resource control message.

Aspect 25: The method of Aspect 23 or 24, wherein the one or more rules specify that a priority of data scheduled to overlap the measurement gap is greater than a priority of the one or more reference signals.

Aspect 26: The method of Aspect 23 or 24, wherein the one or more rules specify that a priority of data scheduled to overlap the measurement gap is less than a priority of the one or more reference signals.

Aspect 27: The method of any of Aspects 23-26, wherein the one or more reference signals include a positioning reference signal.

Aspect 28: The method of Aspect 23, wherein the one or more rules specify that a priority of a data type for communication during a discontinuous reception active time is greater than a priority of the one or more reference signals.

Aspect 29: The method of Aspect 23, wherein the one or more rules specify that a priority of a data type for communication during a discontinuous reception active time is less than a priority of the one or more reference signals.

Aspect 30: An apparatus for wireless communication at a device, comprising a processor; memory coupled with the processor; and instructions stored in the memory and executable by the processor to cause the apparatus to perform the method of one or more of Aspects 1-29.

Aspect 31: A device for wireless communication, comprising a memory and one or more processors coupled to the memory, the one or more processors configured to perform the method of one or more of Aspects 1-29.

Aspect 32: An apparatus for wireless communication, comprising at least one means for performing the method of one or more of Aspects 1-29.

Aspect 33: A non-transitory computer-readable medium storing code for wireless communication, the code comprising instructions executable by a processor to perform the method of one or more of Aspects 1-29.

Aspect 34: A non-transitory computer-readable medium storing a set of instructions for wireless communication, the set of instructions comprising one or more instructions that, when executed by one or more processors of a device, cause the device to perform the method of one or more of Aspects 1-29.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware, firmware, and/or a combination of hardware and software.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items), and may be used interchangeably with "one or more." Where only one item is intended, the phrase "only one" or similar language is used. Also, as used herein, the terms "has," "have," "having," and/or the like are intended to be openended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more transceivers;
   a memory; and
   one or more processors, coupled to the one or more transceivers and the memory, configured to:
      receive, via the one or more transceivers, configuration information specifying one or more rules that indicate a relative priority between a data communication and one or more reference signals;
      determine whether to enter or skip a measurement gap based at least in part on a comparison, performed in accordance with the one or more rules, between a priority of the one or more reference signals associated with the measurement gap and a priority of the data communication, the data communication being scheduled to occur during the measurement gap, and the measurement gap being a scheduled gap in data communications in order for the UE to measure one or more reference signals; and
      enter or skip the measurement gap based at least in part on the comparison.

2. The UE of claim 1, wherein the one or more reference signals include a positioning reference signal.

3. The UE of claim 1, wherein the measurement gap overlaps in time with data to be transmitted or received by the UE as part of a discontinuous reception active state.

4. The UE of claim 1, wherein the measurement gap is configured before or during setup of a connection with a base station.

5. The UE of claim 1, wherein the one or more reference signals comprise aperiodic, semi-persistent, or periodic reference signals.

6. The UE of claim 1, wherein the measurement gap is an upcoming measurement gap scheduled to occur after reception of the indication.

7. A base station for wireless communication, comprising:
   one or more transceivers;
   a memory; and
   one or more processors, coupled to the one or more transceivers and the memory, configured to:
      determine one or more rules for a user equipment (UE) to use to determine whether to enter or skip a measurement gap, the measurement gap being a scheduled gap in data communications in order for the UE to measure one or more reference signals, the one or more rules indicating a relative priority between a data communication and the one or more reference signals by specifying a comparison between a priority of the data communication and a priority of the one or more reference signals; and
      transmit, via the one or more transceivers, configuration information to the UE specifying the one or more rules.

8. The base station of claim 7, wherein the one or more reference signals include a positioning reference signal.

9. The base station of claim 7, wherein the measurement gap overlaps in time with data to be transmitted or received by the UE as part of a discontinuous reception active state.

10. The base station of claim 7, wherein the measurement gap is configured before or during setup of a connection with the UE.

11. The base station of claim 7, wherein the one or more reference signals comprise aperiodic, semi-persistent, or periodic reference signals.

12. The base station of claim 7, wherein the measurement gap is an upcoming measurement gap scheduled to occur after transmission of the indication.

13. A user equipment (UE) for wireless communication, comprising:
   one or more transceivers;
   a memory; and
   one or more processors, coupled to the one or more transceivers and the memory, configured to:
      determine whether to enter or skip a measurement gap based at least in part on a comparison, performed in accordance with one or more rules specified by stored configuration information, the comparison being between a priority of the one or more reference signals associated with the scheduled measurement gap and a priority of the data communication, the data communication being scheduled to occur during the measurement gap, and the measurement gap being a scheduled gap in data communications in order for the UE to measure one or more reference signals; and enter or skip the measurement gap based at least in part on the comparison.

14. The UE of claim 13, wherein the one or more processors, to determine whether to enter or skip the measurement gap, are configured to determine to skip the measurement gap based at least in part on a rule, of the one or more rules, specifying that a priority of data scheduled to overlap the measurement gap is greater than a priority of the one or more reference signals, and wherein the one or more processors are configured to skip the measurement gap based at least in part on a determination to skip the measurement gap.

15. The UE of claim 13, wherein the one or more processors, to determine whether to enter or skip the measurement gap, are configured to determine to enter the measurement gap based at least in part on a rule, of the one or more rules, specifying that a priority of data scheduled to overlap the measurement gap is lower than a priority of the one or more reference signals, and wherein the one or more processors are configured to enter the measurement gap based at least in part on a determination to enter the measurement gap.

16. The UE of claim 13, wherein the one or more reference signals include a positioning reference signal.

17. The UE of claim 13, wherein the one or more processors, to determine whether to enter or skip the measurement gap, are configured to determine that a discontinuous reception (DRX) active time is to overlap with the measurement gap and determine to skip the measurement gap based at least in part on a determination that a priority of a data type for communication during the DRX active time is greater than a priority of the one or more reference signals, and wherein the one or more processors are configured to skip the measurement gap based at least in part on a determination to skip the measurement gap.

18. The UE of claim 13, wherein the one or more processors, to determine whether to enter or skip the measurement gap, are configured to determine that a discontinuous reception (DRX) active time is to overlap with the measurement gap and determine to enter the measurement gap based at least in part on a determination that a priority of a data type for communication during the DRX active time is less than a priority of the one or more reference signals, and wherein the one or more processors are configured to enter the measurement gap based at least in part on a determination to enter the measurement gap.

19. The UE of claim 13, wherein the configuration information is received in a radio resource control message.

20. The UE of claim 13, wherein the one or more reference signals comprise aperiodic, semi-persistent, or periodic reference signals.

21. The UE of claim 13, wherein the measurement gap is an upcoming measurement gap scheduled to occur after reception of an indication in a medium access control control element (MAC CE) to enter or skip the measurement gap.

22. The UE of claim 13, wherein the configuration information comprises an indication in a radio resource control message or a medium access control control element.

23. A base station for wireless communication, comprising:
    one or more transceivers;
    a memory; and
    one or more processors, coupled to the one or more transceivers and the memory, configured to:
        determine one or more rules for a user equipment (UE) to use to determine whether to enter or skip a measurement gap, the measurement gap being a scheduled gap in data communications in order for the UE to measure one or more reference signals, the one or more rules indicating a relative priority between a data communication and the one or more reference signals by specifying a comparison between a priority of the data communication and a priority of the one or more reference signals; and
        transmit, via the one or more transceivers, the one or more rules to the UE.

24. The base station of claim 23, wherein the one or more processors, to transmit the one or more rules, are configured to transmit an indication of the one or more rules in a radio resource control message.

25. The base station of claim 23, wherein the one or more rules specify that a priority of data scheduled to overlap the measurement gap is greater than a priority of the one or more reference signals.

26. The base station of claim 23, wherein the one or more rules specify that a priority of data scheduled to overlap the measurement gap is less than a priority of the one or more reference signals.

27. The base station of claim 23, wherein the one or more reference signals include a positioning reference signal.

28. The base station of claim 23, wherein the one or more rules specify that a priority of a data type for communication during a discontinuous reception active time is greater than a priority of the one or more reference signals.

29. The base station of claim 23, wherein the one or more rules specify that a priority of a data type for communication during a discontinuous reception active time is less than a priority of the one or more reference signals.

30. The base station of claim 23, wherein the measurement gap is configured before or during setup of a connection with the UE.

31. The base station of claim 23, wherein the one or more reference signals comprise aperiodic, semi-persistent, or periodic reference signals.

32. The base station of claim 23, wherein the measurement gap is an upcoming measurement gap scheduled to occur after transmission of an indication in a medium access control control element (MAC CE) to enter or skip the measurement gap.

33. A method of wireless communication performed by a user equipment (UE), comprising:
    receiving, from a base station, configuration information specifying one or more rules that indicate a relative priority between a data communication and one or more reference signals;
    determining whether to enter or skip a measurement gap based at least in part on a comparison, performed in accordance with the one or more rules, between a priority of the one or more reference signals associated with the measurement gap and a priority of the data communication, the data communication being scheduled to occur during the measurement gap, and the measurement gap being a scheduled gap in data communications in order for the UE to measure one or more reference signals; and
    entering or skipping the measurement gap based at least in part on the comparison.

34. The method of claim 33, wherein the one or more reference signals include a positioning reference signal.

35. The method of claim 33, wherein the measurement gap overlaps in time with data to be transmitted or received by the UE as part of a discontinuous reception active state.

36. The method of claim 33, wherein the measurement gap is an upcoming measurement gap scheduled to occur after reception of the indication.

37. The method of claim 33, wherein the one or more reference signals comprise aperiodic, semi-persistent, or periodic reference signals.

38. A method of wireless communication performed by a base station, comprising:
    determining one or more rules for a user equipment (UE) to use to determine whether to enter or skip a measurement gap, the measurement gap being a scheduled gap in data communications in order for the UE to measure one or more reference signals, the one or more rules indicating a relative priority between a data communication and the one or more reference signals by specifying a comparison between a priority of the data communication and a priority of the one or more reference signals; and
    transmitting, to the UE, configuration information specifying the one or more rules.

39. The method of claim 38, wherein the one or more reference signals include a positioning reference signal.

40. The method of claim 38, wherein the measurement gap overlaps in time with data to be transmitted or received by the UE as part of a discontinuous reception active state.

41. The method of claim 38, wherein the measurement gap is an upcoming measurement gap scheduled to occur after transmission of the indication.

42. A method of wireless communication performed by a user equipment (UE), comprising:
    determining whether to enter or skip a measurement gap based at least in part on a comparison, performed in accordance with one or more rules specified by stored configuration information, the comparison being between a priority of the one or more reference signals associated with the scheduled measurement gap and a priority of the data communication, the data communication being scheduled to occur during the measurement gap, and the measurement gap being a scheduled gap in data communications in order for the UE to measure one or more reference signals; and
    entering or skipping the measurement gap based at least in part on the comparison.

43. The method of claim 42, wherein determining whether to enter or skip the measurement gap includes determining to skip the measurement gap based at least in part on the rule specifying that a priority of data scheduled to overlap the measurement gap is greater than a priority of the one or more reference signals, and wherein entering or skipping the measurement gap includes skipping the measurement gap based at least in part on determining to skip the measurement gap.

44. The method of claim 42, wherein determining whether to enter or skip the measurement gap includes determining to enter the measurement gap based at least in part on the rule specifying that a priority of data scheduled to overlap the measurement gap is lower than a priority of the one or more reference signals, and wherein entering or skipping the measurement gap includes entering the measurement gap based at least in part on determining to enter the measurement gap.

45. The method of claim 42, wherein the one or more reference signals include a positioning reference signal.

46. The method of claim 42, wherein determining whether to enter or skip the measurement gap includes determining that a discontinuous reception (DRX) active time is to overlap with the measurement gap and determining to skip the measurement gap based at least in part on a determination that a priority of a data type for communication during the DRX active time is greater than a priority of the one or more reference signals, and wherein entering or skipping the measurement gap includes skipping the measurement gap based at least in part on determining to skip the measurement gap.

47. The method of claim 42, wherein determining whether to enter or skip the measurement gap includes determining that a discontinuous reception (DRX) active time is to overlap with the measurement gap and determining to enter the measurement gap based at least in part on a determination that a priority of a data type for communication during the DRX active time is less than a priority of the one or more reference signals, and wherein entering or skipping the measurement gap includes entering the measurement gap based at least in part on determining to enter the measurement gap.

48. The method of claim 42, wherein the stored configuration information is received in a radio resource control message.

49. The method of claim 42, wherein the measurement gap is configured before or during setup of a connection with a base station.

50. A method of wireless communication performed by a base station, comprising:
    determining one or more rules for a user equipment (UE) to use to determine whether to enter or skip a measurement gap, the measurement gap being a scheduled gap in data communications in order for the UE to measure one or more reference signals; and
    transmitting configuration information specifying the one or more rules to the UE in a radio resource control message.

51. The method of claim 50, wherein the one or more rules specify that a priority of data scheduled to overlap the measurement gap is greater than a priority of the one or more reference signals.

52. The method of claim 50, wherein the one or more rules specify that a priority of data scheduled to overlap the measurement gap is less than a priority of the one or more reference signals.

53. The method of claim 50, wherein the one or more reference signals include a positioning reference signal.

54. The method of claim 50, wherein the one or more rules specify that a priority of a data type for communication during a discontinuous reception active time is greater than a priority of the one or more reference signals.

55. The method of claim 50, wherein the one or more rules specify that a priority of a data type for communication during a discontinuous reception active time is less than a priority of the one or more reference signals.

56. The method of claim 50, wherein the one or more reference signals comprise aperiodic, semi-persistent, or periodic reference signals.

57. The method of claim 50, wherein the measurement gap is configured before or during setup of a connection with a base station.

58. The method of claim 50, wherein the measurement gap is an upcoming measurement gap scheduled to occur after transmission of the indication.

* * * * *